(12) United States Patent
Nagao et al.

(10) Patent No.: US 12,149,456 B2
(45) Date of Patent: Nov. 19, 2024

(54) COMMUNICATION SYSTEM, REMOTE CONTROL MACHINE SYSTEM, AND COMMUNICATION METHOD

(71) Applicant: Kyushu Institute of Technology, Fukuoka (JP)

(72) Inventors: Akinori Nagao, Fukuoka (JP); Yuhei Nagao, Fukuoka (JP); Masayuki Kurosaki, Fukuoka (JP); Hiroshi Ochi, Fukuoka (JP); Kyoshiro Sakamoto, Fukuoka (JP)

(73) Assignee: Kyushu Institute of Technology, Fukuoka (JP)

( * ) Notice: Subject to any disclaimer, the term of this patent is extended or adjusted under 35 U.S.C. 154(b) by 318 days.

(21) Appl. No.: 17/571,495

(22) Filed: Jan. 9, 2022

(65) Prior Publication Data

US 2022/0131661 A1    Apr. 28, 2022

Related U.S. Application Data

(63) Continuation of application No. PCT/JP2020/027085, filed on Jul. 10, 2020.

(30) Foreign Application Priority Data

Jul. 11, 2019    (JP) .................................. 2019-129207

(51) Int. Cl.
*H04L 5/00* (2006.01)
*H04L 1/00* (2006.01)
(Continued)

(52) U.S. Cl.
CPC .......... *H04L 5/0007* (2013.01); *H04L 1/0057* (2013.01); *H04L 1/1816* (2013.01); *H04W 72/0446* (2013.01); *H04W 72/0453* (2013.01)

(58) Field of Classification Search
CPC ... H04L 5/0007; H04L 1/0057; H04L 1/1816; H04L 1/1887; H04L 5/22; H04W 72/0446; H04W 72/0453; H04W 84/12
See application file for complete search history.

(56) References Cited

U.S. PATENT DOCUMENTS

| 2007/0168826 A1* | 7/2007 | Terry ..................... H04L 1/1848 |
| | | 714/748 |
| 2015/0092645 A1* | 4/2015 | Tabet ..................... H04L 1/1812 |
| | | 370/311 |

(Continued)

FOREIGN PATENT DOCUMENTS

| JP | 2002-186014 | 6/2002 |
| JP | 2015-133533 | 7/2015 |

*Primary Examiner* — Khoa Huynh
(74) *Attorney, Agent, or Firm* — Muramatsu & Associates (57) ABSTRACT

A communication system is designed to achieve high speed of periodic communication while ensuring reliability of communications. An access point and multiple stations are provided. A beacon cycle is set as a reference cycle and a communication period of N reference cycle is set for transmitting data to perform periodic communication. Successive communication periods are overlapped by an overlapping of M cycle which is shorter than the N cycle. The communication period has a normal transmission period and one or more cycles of retransmission period, and the normal transmission period of the next communication period overlaps the retransmission period of the previous communication period. Orthogonal frequency division multiple access method is used for communication between the access point and stations.

8 Claims, 5 Drawing Sheets

(51) Int. Cl.
*H04L 1/1812* (2023.01)
*H04W 72/0446* (2023.01)
*H04W 72/0453* (2023.01)

(56) References Cited

U.S. PATENT DOCUMENTS

2016/0119165 A1\* 4/2016 Keronen ............... H04W 72/02
   370/254
2018/0331792 A1\* 11/2018 Yang .................... H04L 5/0044

\* cited by examiner

COMMUNICATION SYSTEM, REMOTE CONTROL MACHINE SYSTEM, AND COMMUNICATION METHOD

This is a continuation of International Patent Application No. PCT/JP2020/027085 filed Jul. 10, 2020 which claims the benefit of foreign filing priority based on Japanese Patent Application number 2019-129207 filed Jul. 11, 2019, the entire contents of which are incorporated herein by reference.

FIELD OF THE INVENTION

The present invention relates to a communication method and a communication system for periodic communication between an access point and stations. The present invention also relates to a remote control machine system that controls machines, such as industrial robots, using the communication system that implements the communication method.

BACKGROUND TECHNOLOGY

One purpose of industrial networks is to provide fast and reliable synchronized control of industrial machines. Currently, wired networks (Fast Ethernet such as Industrial Ethernet ("Ethernet" is a registered trademark)) are used widely in the industrial networks. However, wired networks have problems such as wiring costs and freedom of placement, and accordingly their wireless versions are desired.

On the other hand, there are already wireless networks for industrial use. For example, there is an iPCF (Industrial PCF) system, which uses the PCF (Point Coordinator Function) function of the wireless LAN standard IEEE802.11. This system transmits control information to each terminal in turn, and thereby achieves a cycle time of 1 [msec]× number of terminals (non-patent document 1).

PRIOR ART DOCUMENTS

[Non-patent document 1] Automatic control by PROFINET wireless communication—Japan Profibus Association, Internet <http://www.profibus.jp/tech/document/pbday2010/ B-5_Siemens.pdf>

SUMMARY OF THE INVENTION

However, it is desired to further increase the speed of periodic communication while ensuring the reliability of the communication, especially in communication used for control of industrial robots, etc.

The present invention aims to further increase the speed of periodic communication while ensuring the reliability of the communication.

Means for Solving the Problems

In order to achieve the above objectives, the communication system of the present invention is equipped with an access point and a plurality of stations, and performs periodic communication between them by setting a constant reference cycle as one cycle and a communication period of N cycles for transmitting data. The communication period has a normal transmission period in which the first transmission is made for data and one or more retransmission periods in which the data that resulted in a communication error during the normal transmission period is retransmitted, in such a way that the normal transmission period of the next communication period overlaps the retransmission period of the previous communication period.

In the communication system of the present invention, the method of communication between the access point and the stations may be an orthogonal frequency division multiple access (OFDMA) method.

Further, the communication system of the present invention may also take the configuration in which the communication between the access point and the stations is wireless communication, the access point transmits data to the station, the station receiving the data transmits another data to the access point, and the access point determines that a communication error has occurred with the station when the access point cannot confirm the another data from the station within a normal transmission period.

Furthermore, the communication method of the present invention performs periodic communication by setting a communication period of N cycles for transmitting data with a constant reference cycle as one cycle. The communication period has a normal transmission period in which the first transmission is performed for the data and one or more retransmission periods in which the data that resulted in a communication error in the normal transmission period is retransmitted. The normal transmission period of the next communication period overlaps the retransmission period of the previous communication period.

The communication method of the present invention may use orthogonal frequency division multiple access for communication between the access point and the plurality of stations.

As an example, in performing periodic communication in a wireless LAN network, a beacon cycle is set to one cycle, and a communication period of N cycle is set to transmit data. The N cycle set to transmit previous data and the N cycle set to transmit the next data are overlapped in the period of M cycle which is shorter than N cycle, thereby retransmitting the previous data while transmitting the next data during the retransmision period. This makes it possible to achieve high speed transmission due to the periodic transmission by (N-M) cycle. In addition, when a transmission error occurs, the data is retransmitted thereby ensuring high reliability of the communication. Further, the OFDMA communication method using trigger frames can also be used, in which case more efficient communication can be realized as centrally controlled communication is possible.

In the communication method of the present invention, the periodic communication is a wireless communication between an access point and a plurality of stations. The access point transmits data to the stations, and the station receiving the data transmits another data to the access point. The access point may determine that a communication error has occurred with the station when it cannot confirm another data from the station within a normal transmission period.

Furthermore, the remote control machine system of the present invention has a controller, a machine controlled by the controller, and the communication system described above. The controller is connected to the access point of the communication system, the machine is connected to the station of the communication system, and the control data generated by the controller is transmitted to the machine by the communication system.

In this case, the machine may be an industrial robot.

Effect of the Invention

According to the present invention, the speed of the periodic communication can be further increased while ensuring the reliability of the communication.

DETAILED DESCRIPTION OF THE PREFERRED EMBODIMENTS

The present invention will be described in detail based on the embodiments shown in the drawings below.

Figure 1:
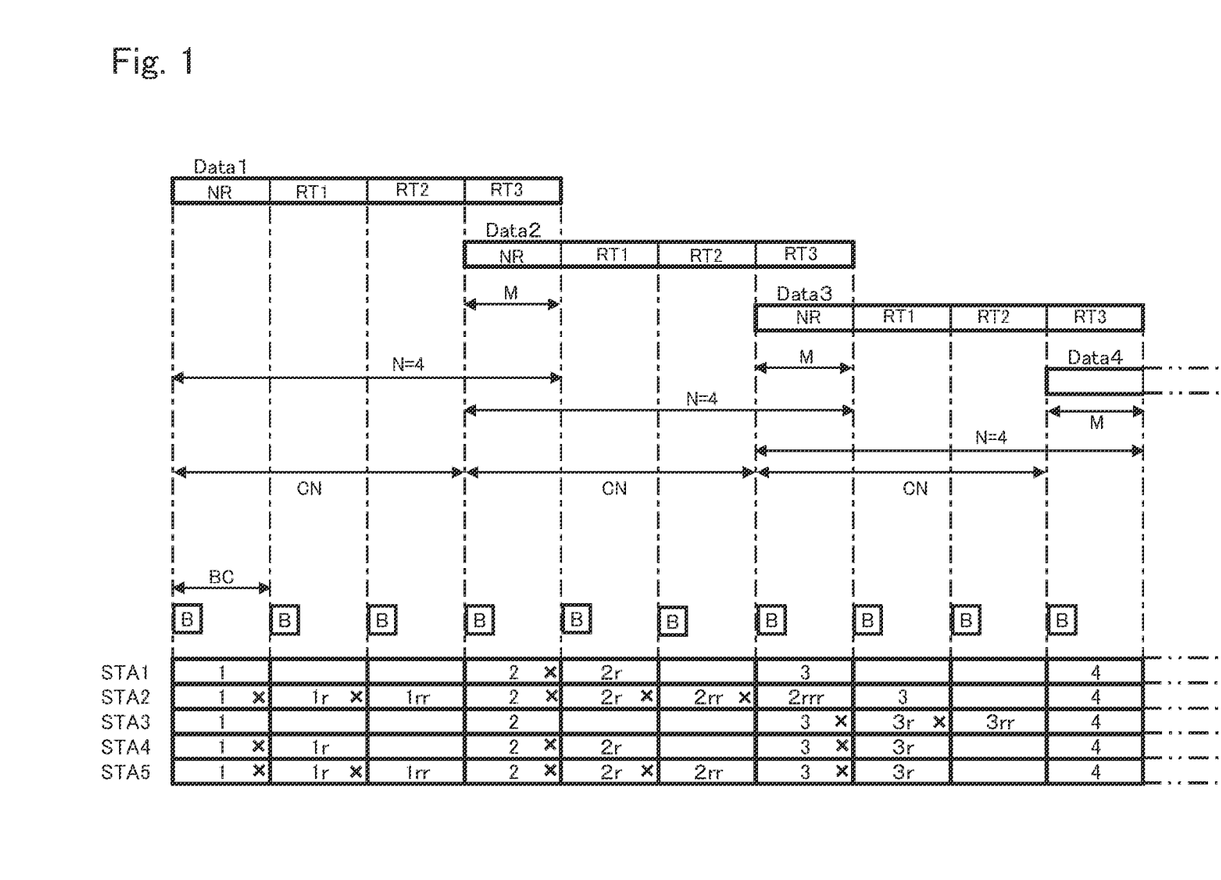
FIG. 1 is a diagram for explaining the concept of the communication method of the present invention where an overlapping period M is 1.

FIG. 1 shows an embodiment example for implementing the communication method of the present invention. This communication method in this embodiment performs periodic communication by setting a constant reference cycle, for example, a beacon cycle BC as one cycle, and a communication period of N cycle for transmitting data. In this example, N is four beacon cycles, i.e, N=4. The successive communication periods overlap in a period of M cycle (overlapping period M), which is shorter than N cycle with the preceding communication periods. The communication period has a normal transmission period NR and a retransmission period RT for retransmitting the data that resulted in a communication error in the normal transmission period NR, and the normal transmission period of the next communication period NR (n+1th communication period) is overlapped with the retransmission period of the previous communication period (nth communication period) for the overlapping period M.

In this embodiment shown in FIG. 1, between the access point (parent unit) and five stations (child units) STA1-STA5, the communication is performed by 1-to-5 orthogonal frequency division multiple access (OFDMA) method. The access point periodically transmits beacon frames (indicated by the square "B" in the drawing), thereby forming a beacon cycle BC with a constant period. Then, four beacon cycles are used as the communication period (N=4). The first beacon cycle is the normal transmission period (indicated by "NR" in the drawing), the second beacon cycle is the first retransmission period (indicated by "RT1" in the drawing), the third beacon cycle is the second retransmission period (indicated by "RT2" in the drawing), and the fourth beacon cycle is the third retransmission period (indicated by "RT3" in the drawing).

The first data (indicated by "Data1" in the drawing) is transmitted in the first communication period (first cycle), and the second data (indicated by "Data2" in the drawing) is transmitted in the second communication period (second cycle), and the nth data is transmitted in the nth communication period. In this manner, the subsequent data is transmitted by repeating the above noted data cycle.

The matrix table corresponding to each station STA1-STA5 in FIG. 1 shows the presence or absence of data transmission in each cycle, where characters (number, x, r) in the box indicate that data transmission is present. When there is data transmission, the "number" indicates the number of data, the symbol "x" indicates that the data transmission failed, the subscript "r" indicates that it is the first retransmission data, the subscript "rr" indicates that it is the second retransmission data, and the subscript "rrr" indicates that it is the third retransmission data.

For each station, if the data is successfully transmitted in the normal transmission period NR, no data retransmission is performed for that station (e.g., transmission of the first data (Data1) to the first station (STA1)). In other words, no retransmission of data will be performed in the first through third retransmission periods RT1-RT3.

On the other hand, in FIG. 1, if the data transmission in the normal transmission period fails (communication error), the data is retransmitted to that station (e.g., the first data Data1 transmitted to the fourth station STA4). In other words, the data is retransmitted in the first retransmission period RT1, and if that also fails, the data is retransmitted in the second retransmission period RT2 (e.g., transmission of the first data Data1 to the second station STA2), and if that also fails, the data is retransmitted in the third retransmission period RT3 (e.g., transmission of the second data Data2 to the second station STA2).

The determination of the presence or absence of a communication error is made, for example, in the following manner. The access point sends data (first data) to stations STA1-STA5. After receiving the first data, the stations STA1-STA5 send another data (second data) to the access point. The access point determines that a communication error has occurred with the station when the access point could not confirm the second data within the normal transmission period NR from the stations STA1-STA5. For example, if the second data from station STA2 is not confirmed within the normal transmission period NR, the access point determines that a communication error has occurred with STA2. In each retransmission period RT, the communication error is determined in the same way.

If the data transmission is successful by the third of the four communication periods (N=4), only the data of the next communication period is transmitted in the overlapping period M. For example, in the overlapping period M of the first and the second communication periods, only the second data "Data2" of the second communication period is transmitted.

On the other hand, if the data transmission has not been successful by the third period of the four communication periods, the retransmission data of the previous communication period and the new data of the next communication period are transmitted in the overlap period. For example, in the overlapping period M of the second and the third communication periods, both the Data2 of the second communication period and the Data3 of the third communication period are transmitted.

In this embodiment, successive communication periods are overlapped by a period M of one beacon cycle BC. That is, the last (third) retransmission period of the previous communication period and the normal transmission period NR of the subsequent communication period are overlapped (M=1). Therefore, in this example, a control cycle CN is 3 (=N−M) beacon cycles BC.

Figure 2:
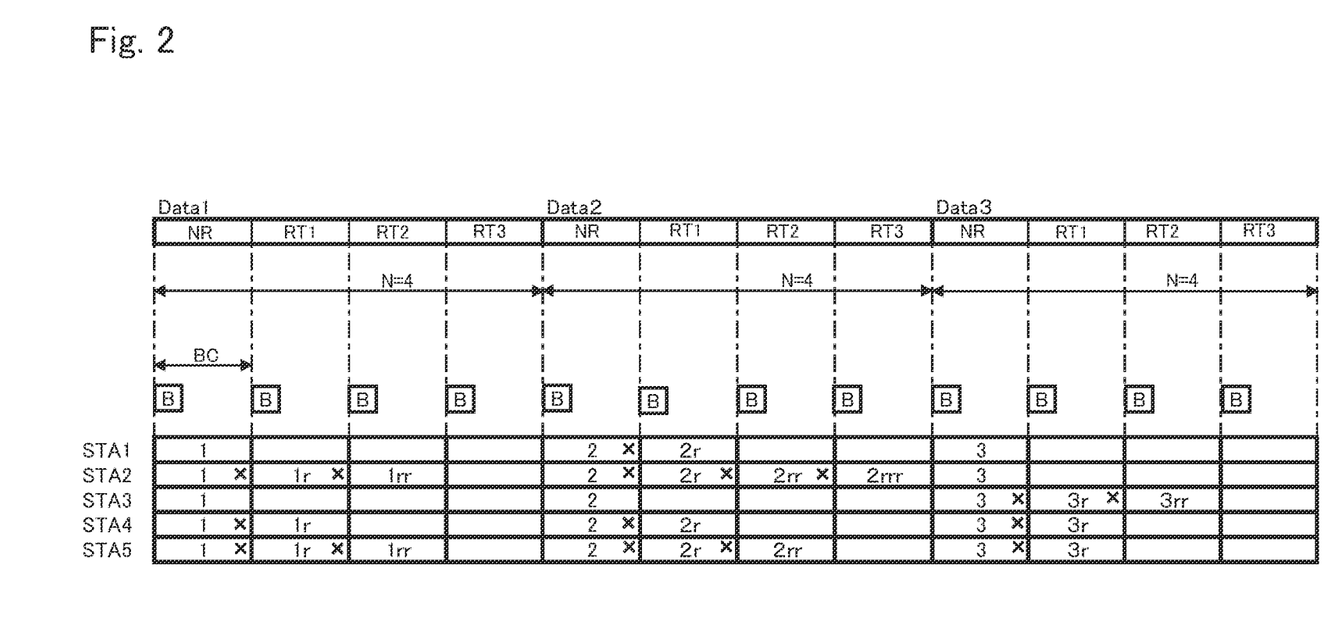
FIG. 2 is a diagram showing a comparative example of the communication method of the present invention where the overlapping period M is 0.

Here, as a comparative example, FIG. 2 shows a timing relationship without the overlapping period. This comparative example has the same conditions as the example in FIG. 1, except that it does not overlap (M=0). Accordingly, the next communication period (N=4) starts after the previous communication period (N=4) ends, and the control cycle CN has four cycles which is the same as the communication period. In other words, in this comparative example, regardless of whether the data is retransmitted or not, the next data is not transmitted until the three retransmission periods (RT1-RT3) are completed, which makes the control cycle CN longer. And it is clear from FIG. 2 that there arise many unused bandwidths in each communication period, indicating that the bandwidth as a communication resource is not used efficiently.

In contrast, in the present invention shown in FIG. 1, the bandwidth that is not used in the example of FIG. 2 is efficiently used by overlapping between the previous and next communication periods, thereby shortening the control cycle CN. As a result, high-speed control communication can be achieved. In addition, high reliability of communication is ensured since the data retransmission is performed when the transmission error is detected.

Figure 3:
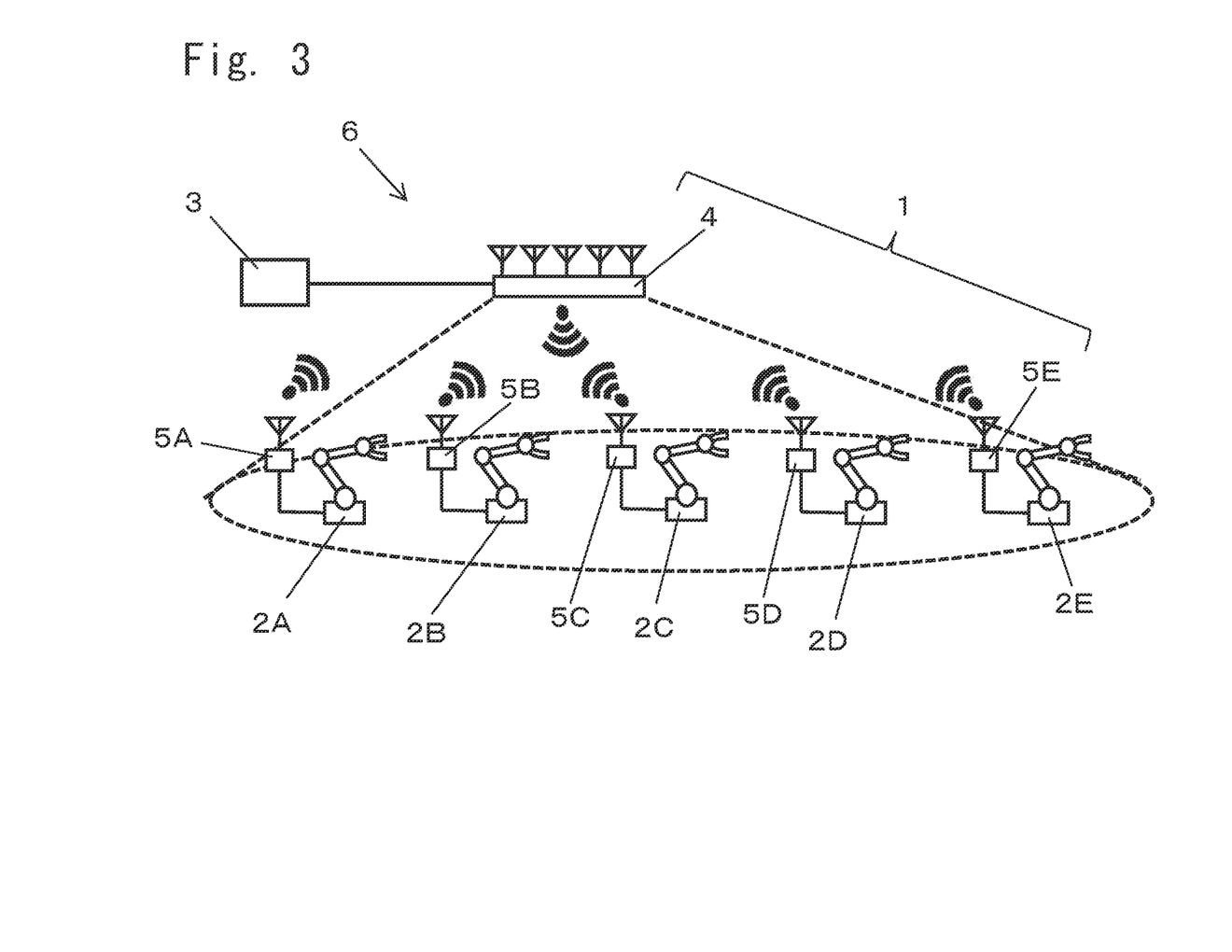
FIG. 3 is a diagram showing an embodiment of the communication system and the remote control machine system of the present invention.

FIG. 3 shows an example of a communication system that implements the communication method of the present invention described above. The communication system 1 connects, for example, industrial robots 2A-2E and a controller 3, and includes an access point (parent unit) 4 connected to the controller 3, and stations (child unit) 5A-5E connected to the industrial robots 2A-2E. Periodic communication is carried out between the access point 4 and each of the stations 5A-5E using the communication method described above. As shown, in this embodiment, five industrial robots 2A-2E and the corresponding five stations 5A-5E are provided.

Further, FIG. 3 shows an example of a remote control machine system equipped with the communication system 1. The remote control machine system 6 has the controller 3, machines 2A-2E controlled by the controller 3, and the communication system 1. The controller 3 is connected to the access point 4 of the communication system 1, and the machines 2A-2E are connected to the stations 5A-5E of the communication system 1. The control data generated by the controller 3 is transmitted to the machines 2A-2E by the communication system 1. In this embodiment, the industrial robots are equipped as the machines 2A-2E. However, the machine 2 is not limited to an industrial robot, but can be applied to any machine that is remotely operated and controlled, for example, a camera, sensor, teach pendant, etc.

The controller 3 generates control data for each of the industrial robots 2A-2E. The generated control data is transmitted to the corresponding industrial robots 2A-2E by the communication system 1. For example, the control data for the first industrial robot 2A is transmitted from the access point 4 to the first station 5A, and then to the first industrial robot 2A. The control data for the second industrial robot 2B is transmitted from the access point 4 to the second station 5B and then to the second industrial robot 2B. In the same manner, the control data for the third industrial robot 2C, the control data for the fourth industrial robot 2D, and the control data for the fifth industrial robot 2E are transmitted through the corresponding stations 5C to 5E, respectively.

The control data for each of the industrial robots 2A-2E are transmitted in the same communication period. Taking this communication period as a reference cycle (beacon cycle BC in FIG. 1) and repeating this cycle, each control data is transmitted to the industrial robots 2A-2E via the controller 3. At this time, as described above, the control cycle CN can be shortened because the successive communication periods configured by N cycles are overlapped by a period of M cycle (overlapping period M), which is shorter than N cycle.

Here, the compatibility between factory automation (FA) and periodic communication is described. In FA, the control data is sent to a plurality of robots, and the robots are operated at a predetermined constant interval. As the robots operate at the constant intervals, this interval is sometimes called as a robot operation cycles. The control data includes information such as a start time of the robot's operation, and thus, there would be no problem if the control data can be received by the robot before its operation.

In this situation, if the communication is random access, there is a possibility that the control data cannot be received within the operation cycle, which makes it unsuitable for FA application. Moreover, if the operation cycle is set long enough so that all of the robots are able to receive the control data, high-speed control will not be possible. Thus, it is more suitable in the FA application to have a periodic communication in which a master (access point/parent) manages all of the communication. In this method, the master specifies the order and timing of the communication in advance, and the communication is carried out according to the schedule. The time it takes for all terminals (stations and child units) to receive the data in this communication is called a communication cycle. In the periodic communication, if the communication cycle is the same as or shorter than the operation cycle, that is, if the control data for the next operation is received before the robot performs the next operation, the robot can be controlled without any problem.

Since the communication system 1 and the remote control machine system 6 overlap part of the prior and subsequent communication periods (by the overlapping period M shown in FIG. 1) and thereby the control cycle is shorten by the overlap, the cycle for transmitting the control data can be shortened, which enables high-speed control communication.

In addition, the communication system 1 and the remote control machine system 6 carry out the communication by using the OFDMA (orthogonal frequency division multiple access) method, which enables centralized control communication in which the access point 4 manages all communication, and thus more efficient communication can be achieved.

The above-mentioned embodiment is an example of a suitable implementation of the present invention, but it is not limited thereto, and various variations can be implemented without departing from the scope and spirit of the present invention.

Figure 4:
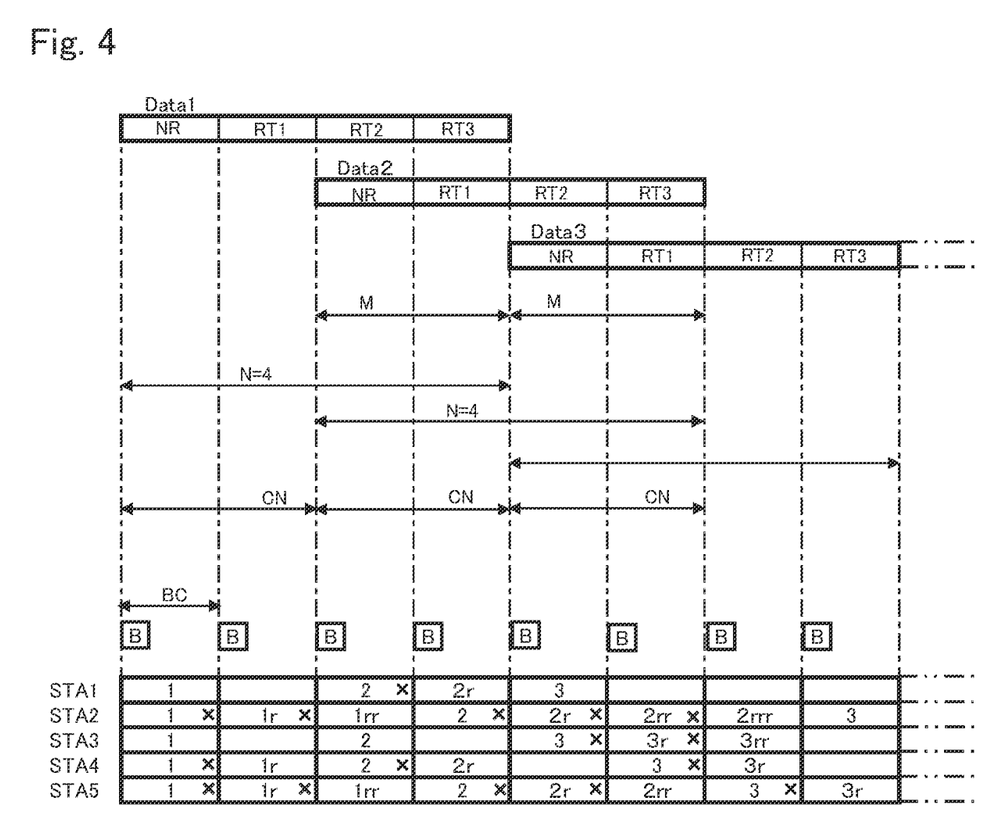
FIG. 4 is a diagram for explaining the concept of the communication method of the present invention in the case where the overlapping period M is 2.

For example, the overlapping period M is not limited to one cycle (M=1). FIG. 4 shows an example in which the overlapping M is set to two cycles (M=2). This example has the same conditions as the example in FIG. 1, except that the number of overlapping period is different. As apparent in FIG. 4, by increasing the number of overlapping period M, the bandwidth used for the communication can be used more efficiently and the control cycle CN can be further shortened. It is also possible to further increase the overlapping cycle. For example, the next data Data2 can be transmitted during the first retransmission period RT1 by increasing the overlapping period to M=3. In this case, the bandwidth used for communication can be used even more efficiently and the control cycle CN can be further shortened.

Moreover, in the above description, while the number of stations 5A-5E is assumed to be five, the number of stations is not limited to five.

In the above description, while the communication between the access point 4 and each of the stations 5A-5E is assumed to be wireless communication, it can also be wired communication. In this case, the occurrence of transmission errors can be reduced.

In the above description, a period of time (a constant reference cycle) is formed as a reference by using beacon frames (beacon cycle BC) periodically transmitted by the access point 4. However, the means of forming the constant period is not limited to this method. For example, if the wired communication is used between the access point 4 and each of the stations 5A-5E, the constant reference cycle can be formed by periodically sending a synchronization signal.

Furthermore, the present invention is not limited to the configuration described above which uses industrial robots as the machines 2 of the remote control machine system 6. The present invention can be applied to any machine that is remotely operated and controlled. For example, it can be applied to NC machine tools, lathes, AGVs (Automated Guided Vehicles), etc. In addition to machines in the field of factory automation (FA), the communication system of the present invention is also applicable to medical machines used for remote surgical operations, heavy machinery and work equipment such as cranes and transport vehicles used at construction sites and civil engineering sites, tractors, seeders, rice transplanters, sprayers used in agriculture, forestry, and fisheries, unmanned aerial vehicles such as drones, transport machinery, and mobile machinery. It is also applicable to continuous unloaders, various types of cranes, AGVs, etc. used in port cargo handling.

In the above description, while the orthogonal frequency division multiple access method is as used as the method of communication between the access point 4 and the stations 5, communication method is not limited to this method. For example, frequency division multiplexing (FDMA), code division multiplexing (CDMA), etc. can also be used.

Embodiment 1

The present invention enables high-speed and highly reliable synchronous control for multiple industrial machines via wireless networks in industrial fields such as factory automation (FA). Conventionally, wired networks (Fast Ethernet such as Industrial Ethernet ("Ethernet" is a registered trademark)) have been used for most industrial networks. However, due to problems such as high wiring costs and inconvenience of placement, its wireless version has been desired. In recent years, wireless network technology for industrial use has made progress. However, the transmission error rate of the wireless networks is $10^{-2}$ to $10^{-3}$ compared to $10^{-8}$ for the wired networks, and as retransmission must always be taken into consideration, it is not possible to achieve the same high speed as that of the wired networks.

In the present invention, in order to perform periodic communication in a wireless LAN network, a communication period of N cycle is set to transmit data, with a beacon cycle (packet to synchronize the wireless network) as one cycle. The N cycle set for transmitting the previous data and the N cycle set for transmitting the next data are overlapped in a period of the M cycle, which is shorter than the N cycle. Thus, it allows to transmit the next data in the retransmission period while retransmitting the previous data. This makes it possible to achieve high speed data transmission because the periodic communication uses the N-M cycle, and also ensures high reliability because the retransmission is also carried out. Moreover, more efficient communication can be realized because centrally managed communications are possible by using the OFDMA communication method.

The present invention is particularly effective for data transmission in the field of factory automation, where small lot multi-product production is becoming more common and equipment changes are frequent.

Embodiment 2

As an example, an industrial wireless LAN that transmits control data generated by a controller to multiple stations uses a communication protocol that incorporates proprietary technology specialized for FA. As a result, an original SoC (System-on-a-chip) is used and the manufacturing cost becomes high. In order to solve this problem, the next generation wireless standard IEEE802.1ax is taken notice. This standard supports centrally managed communication and multi-user communication. In centrally managed communication, the uplink timing of the station STA can be controlled by using a frame called "trigger". OFDMA is used as the modulation method. While OFDM used to support only one user per frequency band, OFDMA allows the frequency band to be divided more finely and assigned to multiple users, thereby enabling simultaneous transmission. These two technologies are highly useful because they are congruent with the technologies required in the FA field and the like.

In the IEEE802.11 wireless LAN standard, the access point transmits beacon frames periodically. Moreover, the IEEE 802.11 wireless LAN standard adopts the OFDMA communication method with trigger frames. By using its access point, it is possible to implement the present invention with a beacon cycle as one cycle.

Figure 5:
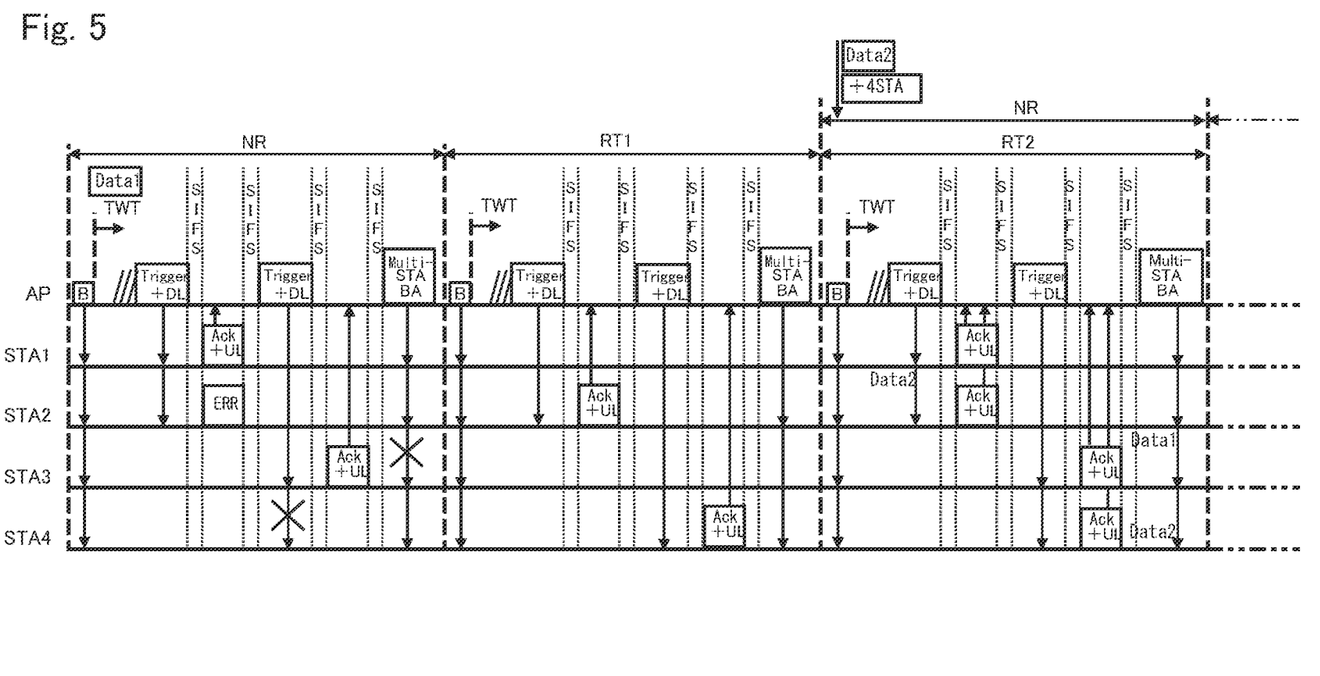
FIG. 5 is a diagram showing an example of the communication protocol of the communication method of the present invention.

FIG. 5 shows an example implementing the present invention to the IEEE 802.11ax standard. In this example, the number of stations that can uplink (UL) at the same time is set to 2 users and the number of stations that communicate is set to 4 (STA1-STA4). In FIG. 5, SISF stands for "Short Inter Frame Space. It is designed that frame error retransmission is to be performed in the next retransmission period. Regarding the communication periods, there is one normal communication period NR and two retransmission periods RT1-RT2. The retransmission period RT2 that is the second of the previous transmissions and the normal transmission period NR of the next communication period are overlapped (overlapping period).

The normal transmission period NR and the retransmission period RT start with a beacon. By specifying the TWT, the station STA is awakened in accordance to the MU cascading sequence starting with a Trigger frame. Here, TWT stands for "Target Wake Time", and MU stands for "Multi-user". The access point AP sends a downlink DL of control data in addition to the Trigger frame. The station STA responds to the DL by acknowledgment Ack and sends UL data in response to the Trigger frame. As uplink UL is performed by two stations, after two Trigger frames are sent, the Multi-STA BA (Multi-Station Block Acknowledgment) is sent to all stations STA1-STA4. At this point, the only stations that have not successfully sent and received frames due to errors are STA2 and STA4. The Multi-STA BA transmission shows that the STA3 did not receive the frame successfully. In this case, the access point AP determines that the communication has been successfully completed because uplink UL was returned and BA (Block Acknowledgment) was also returned. On the other hand, the STA3 determines that there is a frame error because BA has not been returned, and continues to wait for the Trigger frame from the access point AP to retransmit in order to send uplink UL. However, unless the Trigger frame comes from the access point AP, the STA3 cannot send the uplink UL. Therefore, it is necessary to sweep out the remaining Data1 (the first control data) in the STA3 buffer that is not needed to be sent as soon as possible. Thus, by overlapping the original control cycle as shown in FIG. 5, Data2 (the second control data) accumulates in the buffer, and the access point AP can send a Trigger frame. This is the second retransmission period RT2. In this period, the communication of Data1 has already been completed. Therefore, another transmission is made to the stations STA1 and STA2 for Data2 communication. In the subsequent flow, Trigger frames are sent to the remaining stations STA3 and STA4. At this time, the Data1 frame can be spit out that has been accumulated in the buffer of the STA3.

INDUSTRIAL APPLICABILITY

The present invention is applicable, for example, to factory automation equipped with industrial robots, etc., the medical field such as remote surgical operations, and the agriculture, forestry, and fisheries field where unmanned machines are used.

DESCRIPTION OF THE REFERENCE SIGNS

1: Communication system
2: Industrial robot (machine)
4: Access point
5: Station
6: Remote control machine system

What is claimed is:

1. A communication system that is equipped with an access point and a plurality of stations to carry out periodic communication among them by setting a constant reference cycle as one cycle and setting a communication period of N cycle to transmit data, where N is a natural number larger than 2, and each access point and each station has a wireless communication device:
   wherein the communication system has one normal transmission period in which a first transmission of the data is performed and (N−1) of retransmission periods to retransmit data that resulted in a communication error in the normal transmission period, and
   wherein the normal transmission period of a next communication period overlaps the retransmission period of a previous communication period and successive N cycle communication periods overlap in a period of M cycle that is shorter than the N cycle, where M is a natural number smaller than N.

2. The communication system according to claim 1, wherein the communication between the access point and the plurality of stations uses an orthogonal frequency division multiple access method.

3. The communication system according to claim 1, wherein the communication between the wireless communication device of the access point and the wireless communication devices of the plurality of stations is wireless communication;
   wherein the wireless communication device of the access point transmits the data to the wireless communication device of one of the stations, and the wireless communication device of the station that receives the data transmits another data to the wireless communication device of the access point; and
   wherein the access point determines that a communication error has occurred with the station when the another data from the station cannot be confirmed within the normal transmission period.

4. A remote control machine system having a controller, a machine controlled by the controller, and the communication system according to claim 1,
   wherein the controller is connected to the access point of the communication system, and the machine is connected to the station of the communication system, and
   wherein control data generated by the controller is transmitted to the machine by the communication system.

5. The remote control machine system according to claim 4, wherein the machine is an industrial robot.

6. A communication method to perform a periodic communication that sets a constant reference cycle as one cycle and sets N cycle communication period to transmit data to, where N is a natural number larger than 2, and where a communication is made between an access point and a plurality of stations, each having a wireless communication device,
   wherein the communication period has a normal transmission period in which a first transmission of the data is performed and one or a plurality of retransmission periods in which the data that resulted in a communication error in the normal transmission period is retransmitted, and
   wherein the normal transmission period of a next communication period overlaps the retransmission period of a previous communication period and successive N cycle communication periods overlap in a period of M cycle that is shorter than the N cycle, where M is a natural number smaller than N.

7. The communication method according to claim 6, wherein communication is carried out between the wireless communication device of the access point and the wireless communication devices of a plurality of stations by using an orthogonal frequency division multiple access method.

8. The communication method according to claim 6,
   wherein the periodic communication is wireless communication between the wireless communication device of the access point and the wireless communication devices of the plurality of stations;
   wherein the access point transmits the data to one of the stations, and the station that receives the data transmits another data to the access point, and
   wherein the access point determines that an error has occurred with the station when the another data from the station cannot be confirmed within the normal transmission period.

* * * * *